US012642406B1

(12) United States Patent
Alsulaiman et al.

(10) Patent No.: US 12,642,406 B1
(45) Date of Patent: Jun. 2, 2026

(54) SYSTEM AND METHOD FOR CLEANING A SPACE USING AN AUTONOMOUS CLEANING ROBOT

(71) Applicant: KING SAUD UNIVERSITY, Riyadh (SA)

(72) Inventors: Mansour Mohammed Alsulaiman, Riyadh (SA); Mohamed Amine Mekhtiche, Riyadh (SA); Mohamed Abdelkader Bencherif, Riyadh (SA); Naif Saleh Alageel, Riyadh (SA); Ziyad Ibrahim Alharbi, Riyadh (SA); Abdulmalik Mansour Altamrah, Riyadh (SA); Ghulam Muhammad, Riyadh (SA); Aasem Nasser Alyahya, Riyadh (SA); Taha Mohammed Alfakih, Riyadh (SA); Mohammed Mahdi Ahmed Algabri, Riyadh (SA); Abdul Wadood, Riyadh (SA); Ramdane Hedjar, Riyadh (SA); Khalid Almutib, Riyadh (SA); Fadl Dahan, Al-Kharj (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/552,497

(22) Filed: Feb. 27, 2026

Related U.S. Application Data

(63) Continuation of application No. 19/432,688, filed on Dec. 24, 2025, now abandoned.

(51) Int. Cl.
*A47L 9/28* (2006.01)
*A47L 9/00* (2006.01)
(Continued)

(52) U.S. Cl.
CPC ............. *A47L 9/2815* (2013.01); *A47L 9/009* (2013.01); *A47L 9/248* (2013.01); *A47L 9/2842* (2013.01);
(Continued)

(58) Field of Classification Search
None
See application file for complete search history.

(56) References Cited

U.S. PATENT DOCUMENTS 11,407,118 B1 * 8/2022 Augenbraun .......... B25J 9/1612
12,310,545 B1 5/2025 Hamilton
(Continued)

FOREIGN PATENT DOCUMENTS

CN 206815246 U 12/2017
CN 111445368 B 3/2023
CN 118788628 A 10/2024

*Primary Examiner* — Eric W Golightly
(74) *Attorney, Agent, or Firm* — Nath, Goldberg & Meyer; Joshua B. Goldberg

(57) ABSTRACT

A system for removing trash items from a space includes employing an autonomous robot to detect trash within the space, to approach the trash item upon detection and to remove the trash item from the space. The autonomous robot may have two or more trash bins with each trash bin being designated to be filled with a particular category of trash. The categories of trash may be different from one another. The autonomous robot is configured to detect the trash category of the trash item that will be picked up and, after picking up the trash item, to insert it in the appropriate trash bin. This way, the autonomous robot can collect and sort trash items according to their kind. A pan with sweeper arms can be used by the robot for collecting a trash item. In another approach, a trash item can be suctioned by the robot using vacuum.

8 Claims, 12 Drawing Sheets

(51) Int. Cl.

| | |
|---|---|
| *A47L 9/24* | (2006.01) |
| *B25J 11/00* | (2006.01) |
| *B65F 3/00* | (2006.01) |
| *B65F 3/04* | (2006.01) |
| *G06V 10/764* | (2022.01) |
| *G06V 20/52* | (2022.01) |
| *B65F 3/02* | (2006.01) |

(52) U.S. Cl.

CPC ........... *A47L 9/2852* (2013.01); *A47L 9/2873* (2013.01); *A47L 9/2889* (2013.01); *B25J 11/0085* (2013.01); *B65F 3/001* (2013.01); *B65F 3/041* (2013.01); *G06V 10/764* (2022.01); *G06V 20/52* (2022.01); *A47L 2201/022* (2013.01); *A47L 2201/04* (2013.01); *A47L 2201/06* (2013.01); *B65F 2003/0279* (2013.01)

(56) References Cited

U.S. PATENT DOCUMENTS

2024/0292990 A1* 9/2024 Hamilton .............. A47L 9/2857
2024/0359327 A1 10/2024 Hamilton \* cited by examiner

SYSTEM AND METHOD FOR CLEANING A SPACE USING AN AUTONOMOUS CLEANING ROBOT

CROSS-REFERENCE TO RELATED APPLICATION

This application is a continuation of U.S. patent application Ser. No. 19/432,688, filed on Dec. 24, 2025, the entire contents of which are incorporated herein by reference.

TECHNICAL FIELD

The present disclosure relates to cleaning robots, and more particularly, to a system and method for using autonomous cleaning robots to clean a space by removing refuse items from the space.

DISCUSSION OF THE RELATED ART

Robots that work autonomously to clean a space are generally known. However, such robots are typically used for cleaning dust and/or small refuse items that can be suctioned together with the dust as incidental waste. However, waste can sometimes be of a size that is greater than the size of items that can be gathered by using known autonomous dust suctioning robots.

SUMMARY

The present subject matter relates to a system and method of using cleaning robots to autonomously monitor a space for refuse items. A cleaning robot of the present subject matter is configured to identify the presence of a refuse item in the monitored space by using an onboard camera. The robot is then configured to drive near the identified refuse item and collect the same for disposal.

A robot of the present subject matter is built for sorting waste into different onboard waste collection bins based on the category of the collected waste. A robot of the present subject matter is configured to determine the category of the waste picked up in addition to identifying the presence of waste in the first place. Once the waste category is identified, a robot of the present subject matter is configured to collect and store the waste item in the appropriate onboard waste bin.

A robot of the present subject matter can be configured to operate autonomously on a given space to monitor the space and collect any item from the space that is identified as being waste during the monitoring process.

BRIEF DESCRIPTION OF THE DRAWINGS

The above and other features of the present disclosure will become more apparent by describing in detail exemplary embodiments thereof in conjunction with the accompanying drawings, in which.

DETAILED DESCRIPTION OF THE EMBODIMENTS

Figure 1:
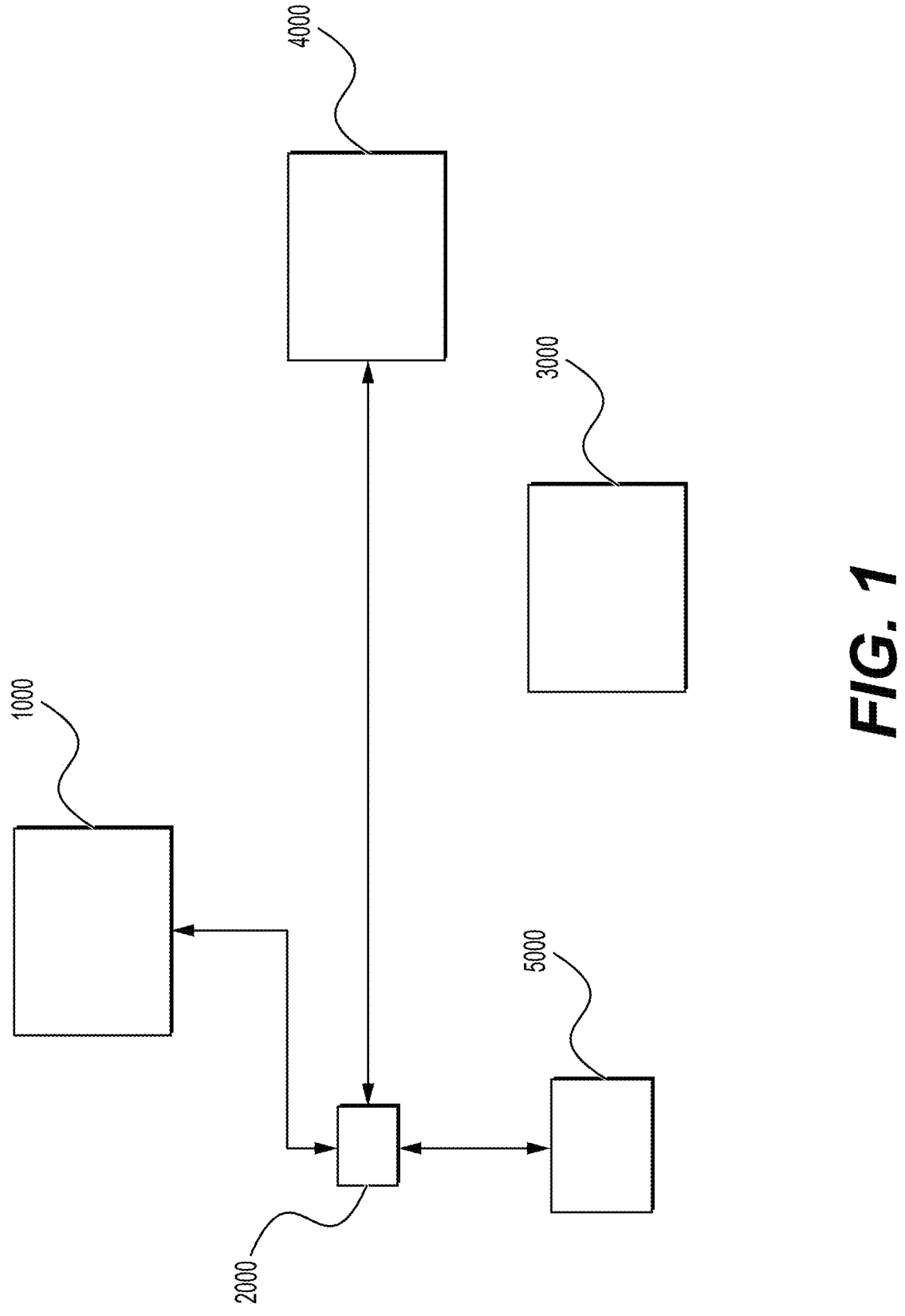
FIG. 1 is a diagram illustrating a system for collecting refuse in accordance with an embodiment of the present subject matter.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" may include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

A system and method for collecting refuse will be described below with reference to a cleaning robot that utilizes a pan mounted to an articulating arm. The robot is configured to detect waste items present in a space being monitored by the robot (where the robot can drive—or move—around the space autonomously). After detection, the robot is configured to drive itself close to the waste item and to bring the pan close to the waste item to scoop or otherwise collect the waste item onto the pan. The articulating arm can then be used to raise the pan with the waste item on it over the body of the robot. Specifically, the articulating arm can be used to position the pan with the waste item on it over an appropriate waste bin that sits on the body of the robot. The pan can then be rotated downwardly to allow the waste item to slide off the pan and fall into the appropriate waste bin below via gravity. The process of monitoring the space for another waste item can then be repeated.

In more detail now, and with reference to FIGS. 1 to 9, a system for collecting refuse includes a cleaning robot 1000, a processor 2000 communicatively coupled to the cleaning robot 1000 and a non-transitory, tangible program storage medium 5000 communicatively coupled to the processor 2000.

The system of FIG. 1 may also include a charging pad 3000 configured to charge an onboard battery of the cleaning robot 1000 (when the cleaning robot 1000 includes a rechargeable battery onboard). The system of FIG. 1 may also include a monitoring and/or controlling station 4000 for monitoring the state of the cleaning robot 1000 and/or for controlling actions of the cleaning robot 1000 when needed (e.g., to override the autonomous operation mode of the cleaning robot 1000).

The cleaning robot 1000 may alternatively be referred to as the "robot" 1000 below for brevity.

Figure 2:
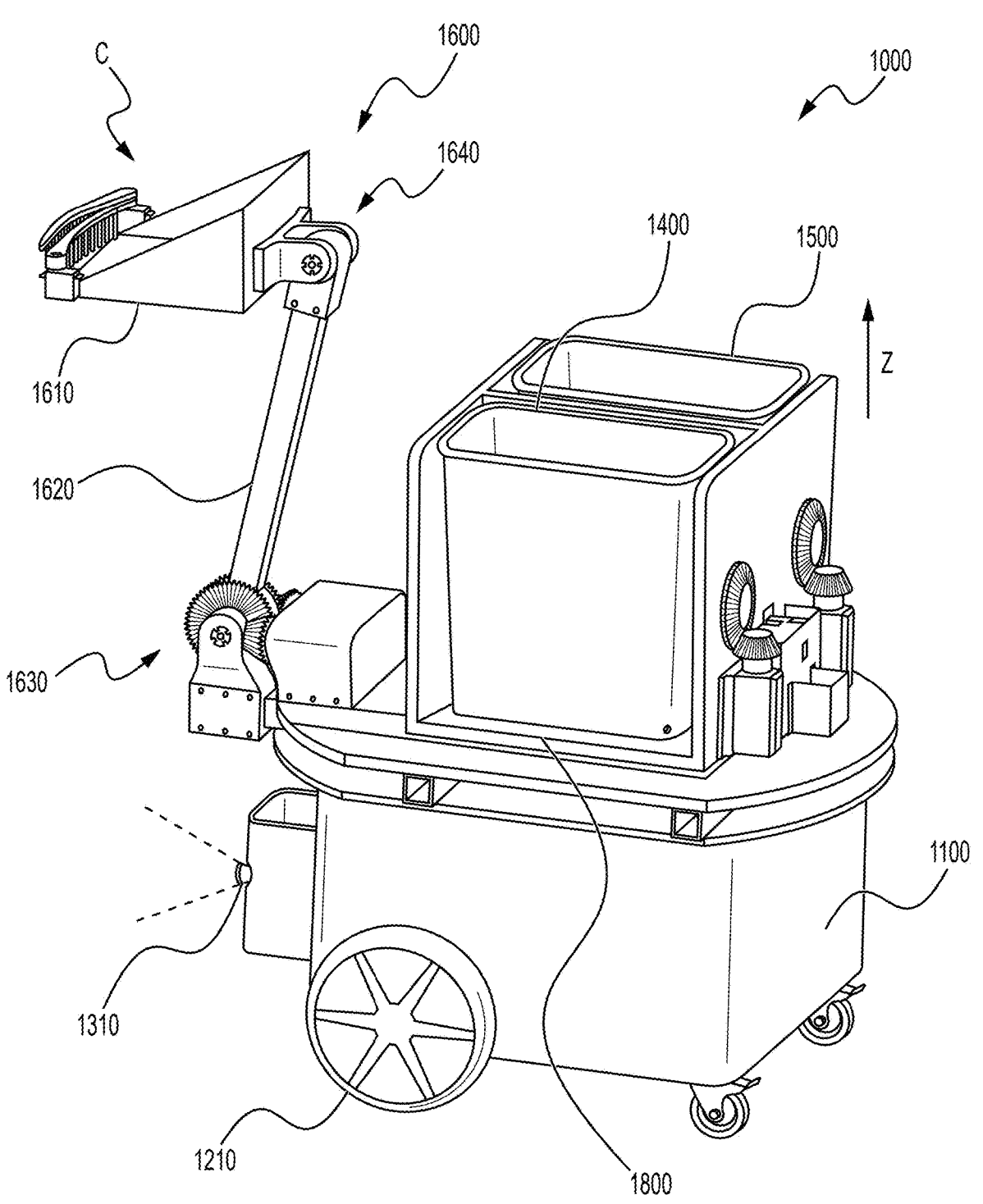
FIG. 2 is a perspective view illustrating a cleaning robot included in the system of FIG. 1.

Referring to FIG. 2, the robot 1000 includes chassis 1100, a first driving wheel 1210 mounted to the chassis 1100, a second driving wheel 1220 (see FIG. 3) mounted to the chassis 1100, a set of monitoring devices including a camera or a video camera 1310 mounted to the chassis 1100, a first refuse container 1400 associated with a first refuse category and a second refuse container 1500 associated with a second refuse category, different from the first refuse category, the first and second refuse containers 1400, 1500 being rotatably mounted to the chassis 1100, a collector assembly 1600 movably connected to the chassis 1100, and an electrical power source 1900 disposed on the chassis 1100.

The robot 1000 may include a first motor 1215 (see FIG. 3) connected to the first driving wheel 1210 and configured to rotate the first driving wheel 1210 bidirectionally. The robot 1000 may also include a second motor 1225 (see FIG. 3) connected to the second driving wheel 1220 and configured to rotate the second driving 1220 wheel bidirectionally and independently of the operation of the first motor 1215.

Figure 3:
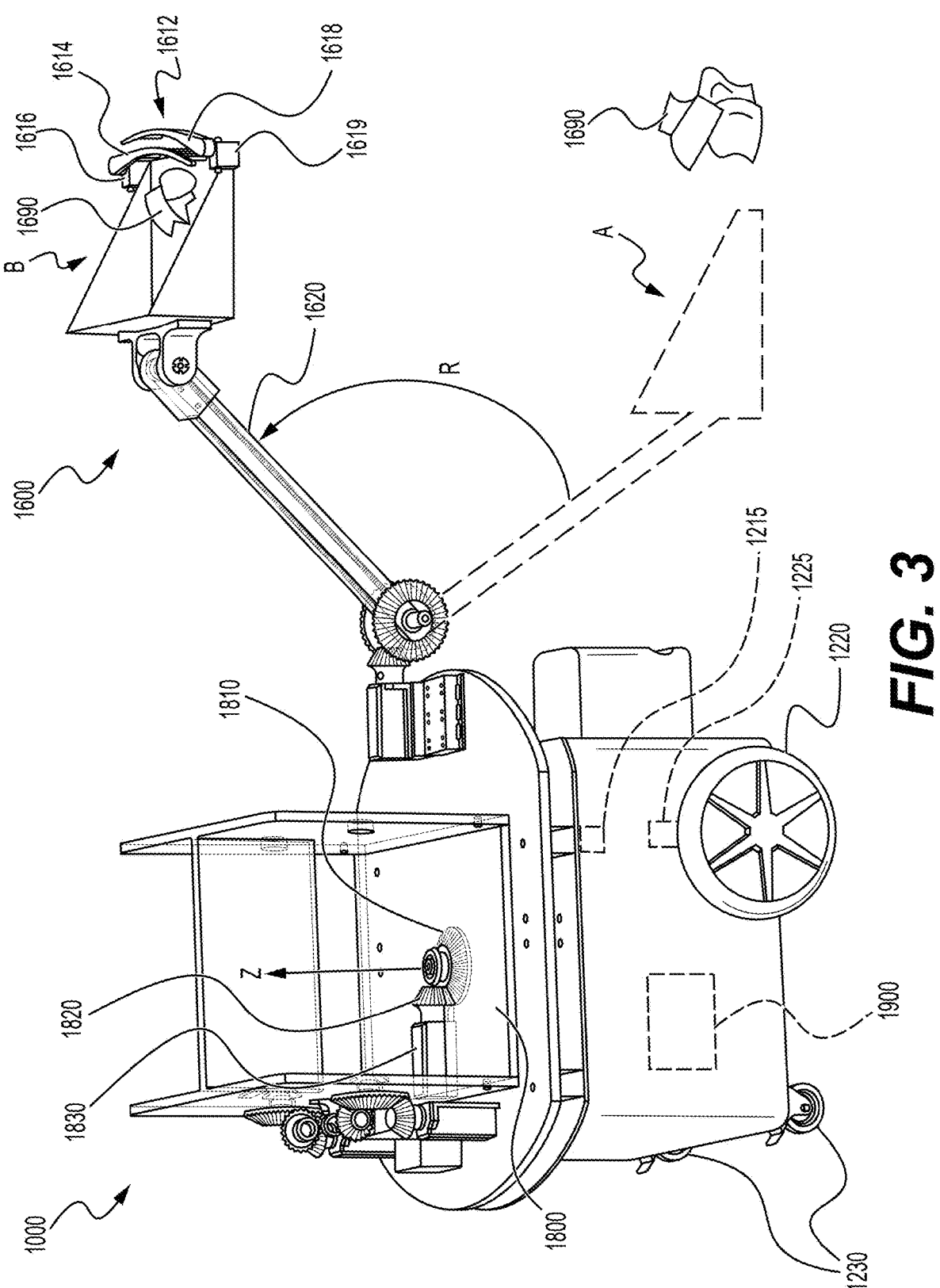
FIG. 3 is a perspective view illustrating the cleaning robot included in the system of FIG. 1.

The robot 1000 may also include one or more non-driving wheels 1230 (e.g., casters), see FIG. 3, configured to facilitate the moving and turning of the robot 1000.

The first and second motors 1215, 1225 may be used to turn the robot 1000 by operating the first and second wheels 1210, 1220 at different speeds. Merely as an example, the robot 1000 can also turn in place (e.g., rotate about its center) by having one of its driving wheels 1210, 1220 drive forward and the other one of its driving wheels 1210, 1220 drive backward.

Figure 4:
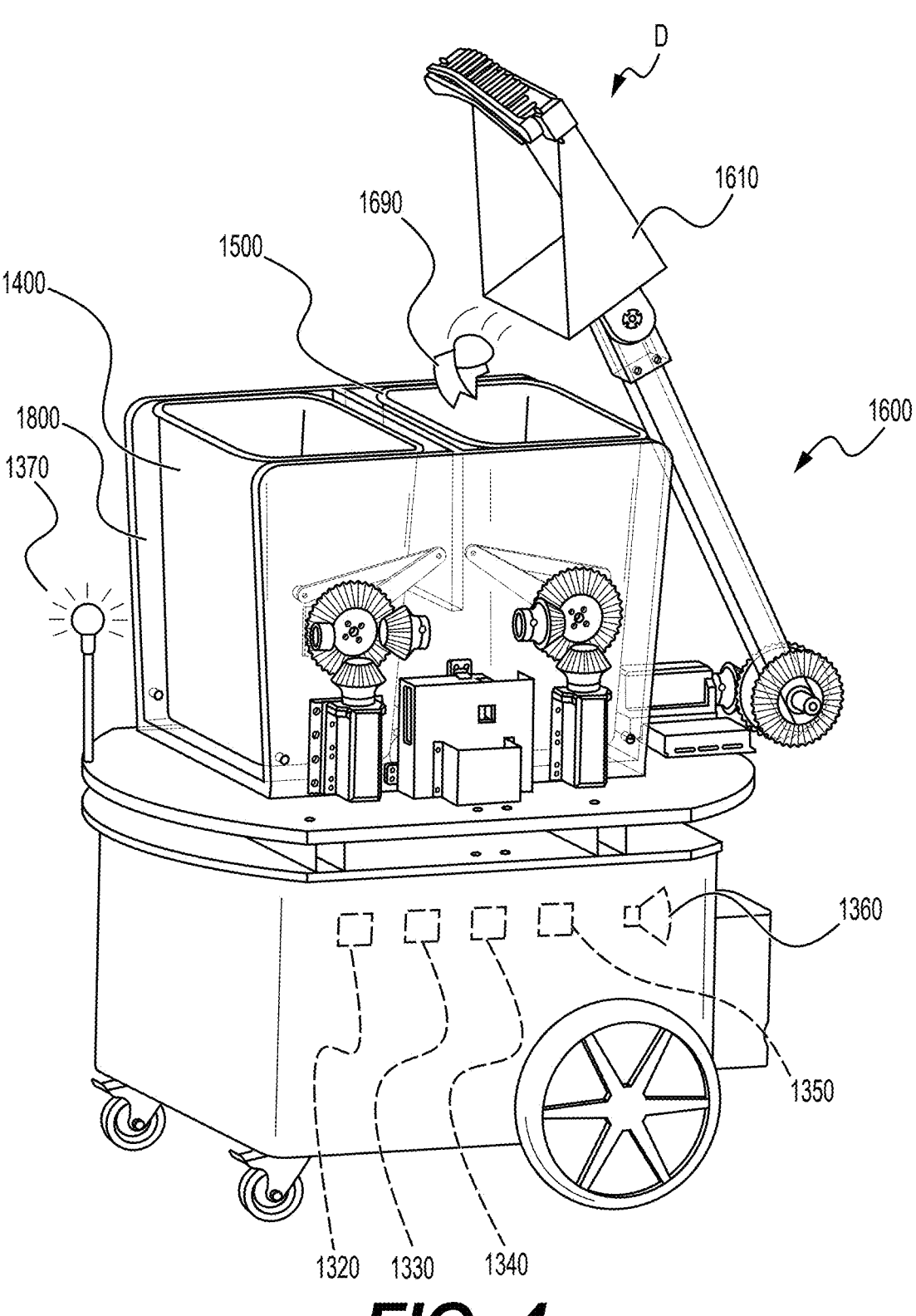
FIG. 4 is a perspective view illustrating the cleaning robot included in the system of FIG. 1 with a component of the cleaning robot shown in transparency.

Referring to FIG. 4, the set of monitoring devices may also include a LiDAR sensor 1320, an ultrasonic sensor 1330, a global positioning sensor (GPS) 1340, a microphone 1350, etc.

The LiDAR sensor 1320, the ultrasonic sensor 1330, and/or the GPS 1340 can be used to guide the robot 1000 such that the robot 1000 can drive (or move) autonomously about a floor space and to prevent the robot 1000 from bumping into static and/or moving objects such as walls, fixtures, furniture, persons and/or pets.

As illustrated in FIG. 4, the robot 1000 may include a speaker 1360 for emitting sounds indicative to persons and/or pets nearby of the presence of the robot 1000 to avoid any unintended collision.

Referring to FIG. 4, the robot 1000 may also include a light source 1370 configured to emit steady light and/or pulsed light to visually alert persons and/or pets that may be located in the vicinity of the robot 1000 that the robot 1000 is nearby and may be operating to collect refuse.

As indicated above, the first and second refuse containers 1400, 1500 may respectively be associated with different categories of refuse such that refuse of different categories that may be found on the floor, on a desk, on a chair, etc., or on other areas within the view of the camera 1310 and accessibility of the robot 1000 can be collected by the robot 1000 and sorted and stored in the appropriate container from among the first and second refuse containers 1400, 1500.

The categories of refuse can be selected from, merely as an example, trash for the landfill (e.g., an unrecyclable item), recyclable paper, recyclable plastic, recyclable metal (e.g., an aluminum can), etc., as the case may be. The refuse categories for the first and second refuse containers 1400,

1500 can be defined by a user of the system based on user preference, based on local regulation for handling refuse, etc.

For example, a first category of refuse (to be inserted in the first refuse container 1400) may be trash (i.e., non-recyclable refuse intended for a landfill) and a second category of refuse, to be inserted in the second refuse container 1500, can be recyclable metal, paper and/or plastic.

In another example, the first refuse category may be a particular type of a recyclable material (e.g., paper refuse for recycling) and the second refuse category may be another type of recyclable material (e.g., plastic refuse for recycling).

The electrical power source 1900 can be used to power the operations of the robot 1000 as described in this specification. The electrical power source 1900 can be, for example, a battery. The battery can be a rechargeable battery. The robot 1000 can be programmed to return to the charging pad 3000 to recharge the battery when the charge level of the battery falls below a predetermined threshold level.

The non-transitory, tangible program storage medium 5000 is readable by the system for collecting refuse. The non-transitory, tangible program storage medium 5000 embodies program of instructions executable by the processor 2000 for performing method steps to collect refuse.

The method steps will be described in detail below with reference to components of the robot 1000 that are configured to perform or assist with performing the method steps.

The method includes monitoring a space using the set of monitoring devices including the camera 1310. The space can be, for example, a floor of an office building, a floor of a hotel, a floor of a residential apartment, etc.

Refuse items may include, merely as an example, food items, paper (whether crumpled, clean, soiled, etc.,) aluminum cans, etc.

The method includes identifying a first refuse item based on the monitoring of the space where the robot 1000 is placed for cleaning. As indicated above, different refuse items can be associated with different refuse categories. An object recognition model, which can be communicatively coupled to the processor 2000, can be trained to detect refuse items by using images and/or video received by using the camera 1310. That is, the object recognition model can be used to distinguish refuse items from non-refuse items.

The object recognition model can also be used to classify an object into a particular kind of refuse. Stated otherwise, the object recognition model can be used to determine the category of refuse to which the identified refuse item belongs to.

As an example, with reference to FIG. 3, the robot 1000 can detect a crumpled piece of paper 1690 from a distance by capturing one or more images and/or video of the crumpled paper 1690 by using the camera 1310 when the crumpled piece of paper 1690 is positioned within the view of the camera 1310.

Merely as an example, the method may include identifying the first refuse item 1690 as being refuse and associating the item 1690 as a recyclable paper.

The method may include moving the cleaning robot 1000 toward the identified first refuse item 1690 using the first and second driving wheels 1210, 1220.

The moving step can be carried out until the robot 1000 approaches the identified first refuse item 1690 within a range of distance where the robot 1000 can be used to collect and store the identified first refuse item 1690 in an appropriate refuse container from among the first and second refuse containers 1400, 1500.

For example, one or more images or video sequences captured using the camera 1310 may be analyzed to determine the location of the first refuse item 1690 relative to the location of the robot 1000. The robot 1000 can then autonomously drive toward the item 1690 until it positions itself close enough to utilize the collector assembly 1600 to collect the item 1690.

The method may include associating the identified first refuse item (e.g., the item 1690) with a refuse category selected from among the group consisting of the first and second refuse categories (of the first and second refuse containers 1400, 1500) based on an analysis of one or more images or video sequences obtained by using the camera 1310.

A prerequisite of the associating step described herein is that a refuse container, from among the first and second refuse containers 1400, 1500, is designed to accept the same category of refuse as that of the first identified object.

The method may include placing a refuse container, from among the group consisting of the first and second refuse containers 1400, 1500, which matches the refuse category associated with the identified first refuse item, in a receiving position on the chassis 1100. See FIG. 4, exemplarily illustrating the second refuse container 1500 placed in a receiving position (e.g., below a raised pan 1610 of the collector assembly 1600) for receiving the identified first refuse item.

In the non-limiting example of FIG. 4, the refuse item 1690 is associated with the second refuse container 1500 because in this example the refuse item 1690 is a crumpled piece of paper, which is categorized as recyclable paper, and the second refuse container 1500 is exemplarily designated to accept recyclable paper waste.

The method may include operating the collector assembly 1600 to collect the identified first refuse item and to transport the collected first refused item into the refuse container placed in the receiving position. See FIGS. 2 and 4, illustrating the collector assembly 1600 in different stages of collecting the first refuse item 1690 and transporting (i.e., raising and then dumping) the item 1690 in the second container 1500, with the second refuse container 1500 placed in the receiving position (i.e., below the pan 1610 where it can catch the item 1690 falling from the pan 1610).

Referring to FIG. 2, the collector assembly 1600 includes:
the pan 1610, configured to carry refuse;
an arm 1620 having a length;
a first joint 1630 rotatably connecting the arm 1620 to the chassis 1100; and
a second joint 1640 rotatably connecting the arm 1620 to the pan 1610.

The first and second joints 1630, 1640 may be spaced apart from one another by the length of the arm 1620.

As can be gleaned with reference to FIGS. 2-4, a rotation of the arm 1620 about the first joint 1630 is configured to cause the second joint 1640 and the pan 1610 to be raised or lowered, depending on a direction of said rotation.

For example, FIG. 3 illustrates in a broken line the pan 1610 in position "A", lowered at the lowest level possible (e.g., on the floor). Position "B" in FIG. 3 illustrates the pan 1610 raised above the floor level after rotating the arm 1620 about the rotational direction "R". Position "C" in FIG. 2 illustrates the pan 1630 raised even higher than in position "B", which occurs when the arm 1620 is rotated in the direction "R" after reaching position "B." Position "D" is the dumping position, where the pan 1610 is located above a container 1400 or 1500 for dumping a refuse item in the container 1400 or 1500. Position "D" delimits the range of rotation of the arm 1620 in the direction "R".

After having dumped an item in a container 1400 or 1500, the arm 1620 can be rotated in a direction opposite to the direction "R" to lower the pan 1610 to substantially the same elevation of the elevation of the subsequent trash item that can be identified for pickup to repeat the steps of capturing the subsequent trash item and dumping the same in a container 1400 or 1500.

Figures 7, 8:
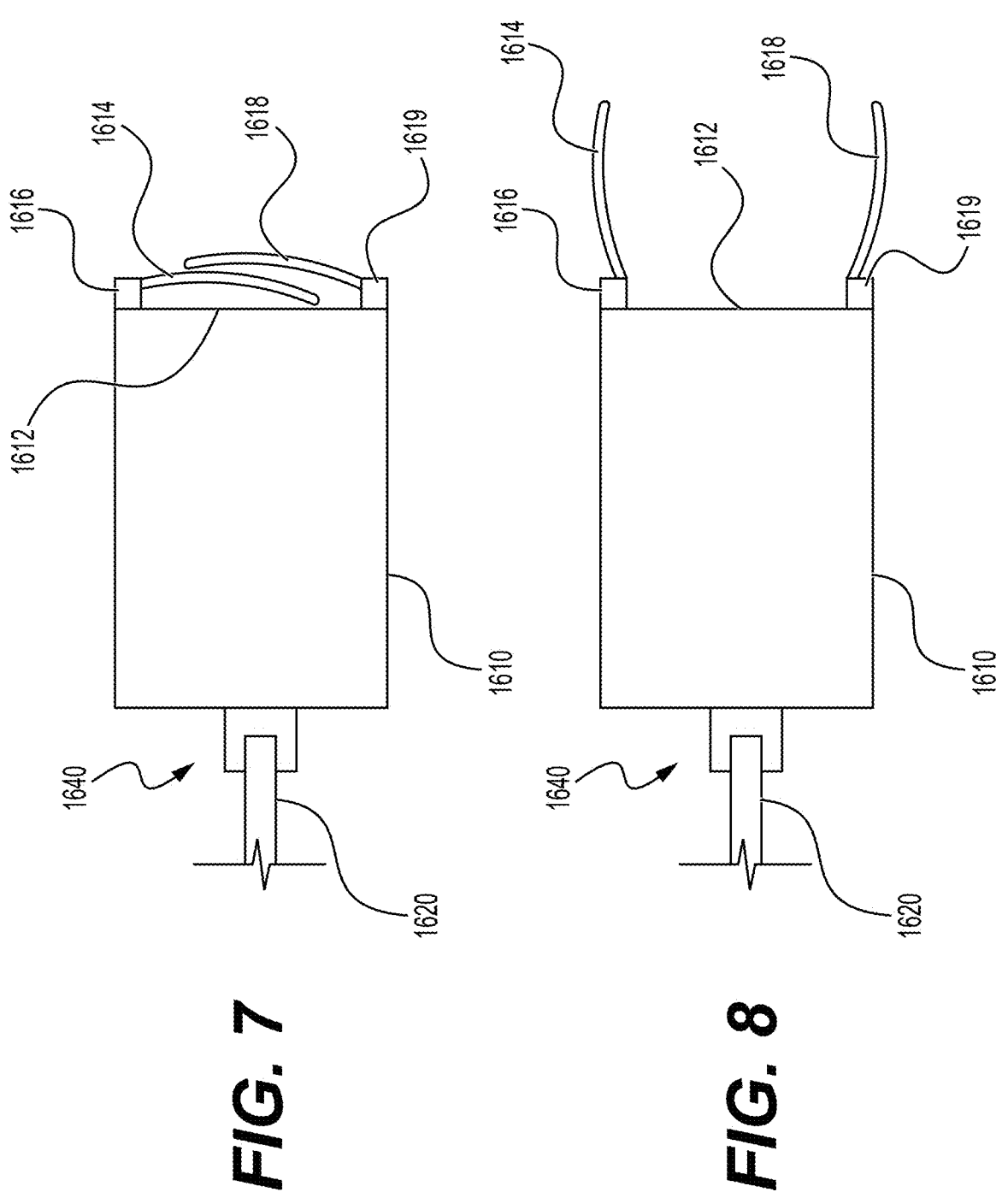
FIG. 7 is a top plan view illustrating a pan of the cleaning robot of FIG. 1 with frontal collecting arms in a first state.
FIG. 8 is a top plan view illustrating the pan of the cleaning robot of FIG. 1 with frontal collecting arms in a second state.

To help capture refuse objects located in front of the pan 1610, and with reference to FIGS. 7 and 8, first and second sweeping structures 1614 and 1618 may be rotatably connected to the pan 1610 via respective motors 1616 and 1619 to rotate to an open state, as illustrated in FIG. 8 to position a refuse item between the opened first and second sweeping structures 1614 and 1618, and to rotate to a closed state, as illustrated in FIG. 7, to push (or sweep) the refuse item onto the pan 1610.

The first and second sweeping structures 1614 and 1618 may each have a comb-like structure or a brush-like structure to assist with the pushing (or sweeping) motion of a refuse into the pan 1610.

As illustrated in FIGS. 7 and 8, the first and second weeping structures 1614 and 1618 may be disposed adjacent to a front edge 1612 of the pan 1610 to assist with the pushing (or sweeping) motion described above to increase the likelihood of success of capturing a refuse item located in front of the pan 1610 and moving the captured refuse item onto the pan 1610.

Figure 9:
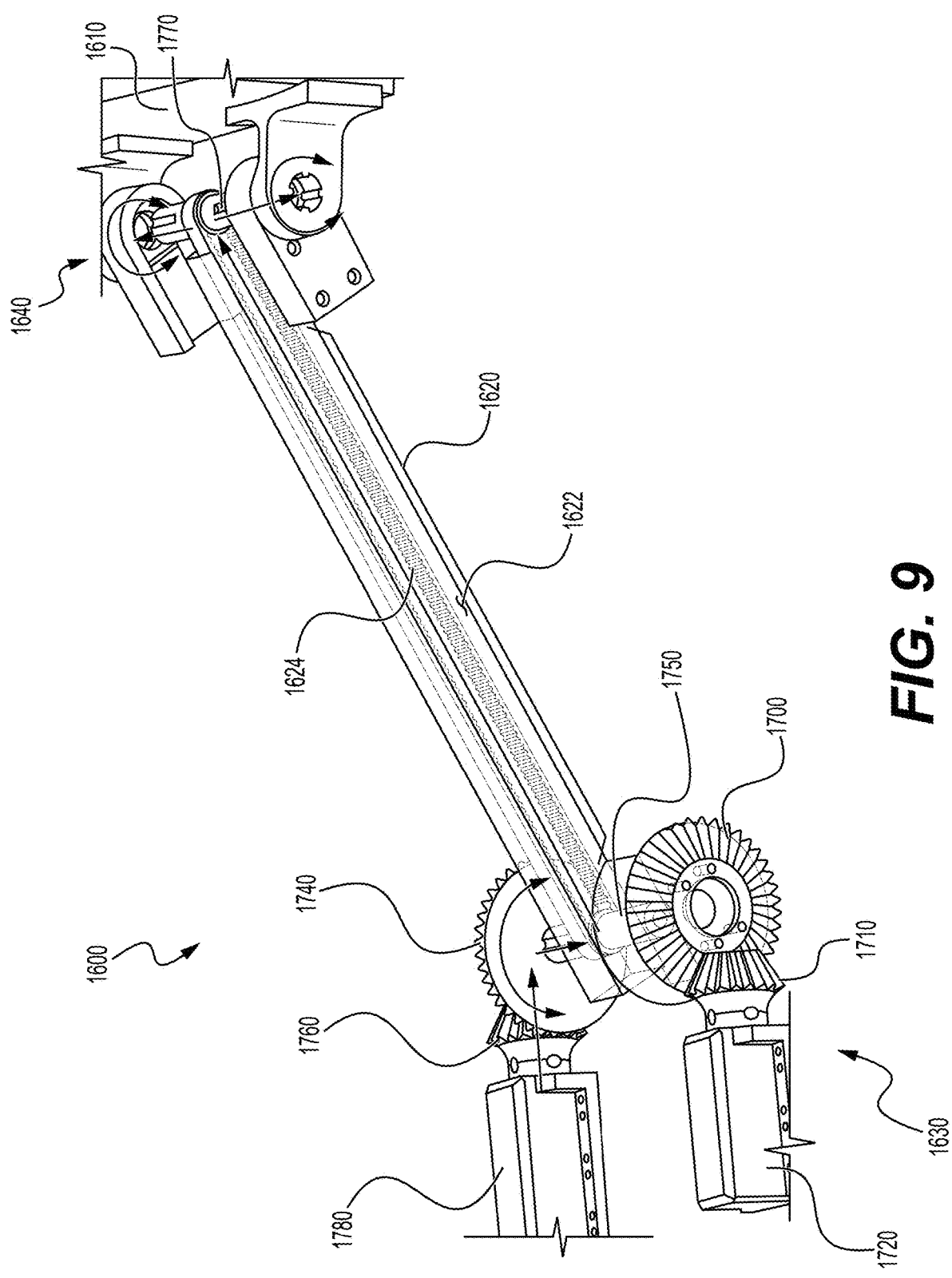
FIG. 9 is a perspective view illustrating an arm of the cleaning robot of FIG. 1 in transparency and in isolation from other components of the cleaning robot.

Referring to FIG. 9, the first joint 1630 includes:

a first arm gear 1700 fixedly connected to the arm 1620 (the first arm gear 1700 may be conically shaped); and a second arm gear 1710 (which may be conically shaped) engaged with the first arm gear 1700.

This way, a rotation of the second arm gear is 1710 configured to cause the first arm gear 1700 to rotate in the direction "R" or in a rotational direction opposite to the direction "R" about the first joint 1630.

An arm motor 1720 is connected to the second arm gear 1710. The arm motor 1720 is configured to drive the second arm gear 1710 such that the pan 1610 (and the arm 1620) can be raised or lowered by rotating the arm 1620 in the direction "R" or in an opposite rotational direction than the direction "R."

Referring to FIG. 9, the first joint 1630 may also include:

a first pan gear 1740 having a first central axle 1750; and a second pan gear 1760 engaged with the first pan gear 1740.

The first and second pan gears 1740, 1760 may respectively have a shape similar to or the same as the shape of the first and second arm gears 1700, 1710.

The first central axle 1750 of the first pan gear 1740 may extend inside of the arm 1620 in a direction that is lateral to the length of the arm, as illustrated in FIG. 9. The first central axle 1750 is rotatably connected to the arm 1620. The first central axle 1750 may be concentric with the first arm gear 1700.

Referring to FIG. 9, the second joint 1640 includes a second central axle 1770 extending inside of the arm 1620 in a direction that is lateral to the length of the arm 1620. The second central axle 1770 is rotatably connected to the arm 1620 and fixedly connected to the pan 1610. This way, a rotation of the second central axle 1770 about the arm 1620 is configured to rotate the pan 1610 about the arm 1620 by the same degree of rotation.

As illustrated in FIG. 9, the arm 1620 includes a cavity 1622 extending on the inside of the arm 1620 along the length of the arm 1620. The cavity 1622 may extend from the first central axle 1750 to the second central axle 1770.

Referring to FIG. 9, the collector assembly 1600 may also include a chain, a belt, a string, a rope, or similar material 1624 forming a loop around the first and second central axles 1750, 1770 in the cavity 1622. The chain, the belt, the string, the rope, etc., 1624 may be referred to as the "chain" 1624 for brevity purposes. The chain 1624 is movably engaged to the first and second central axles 1750, 1770.

Referring to FIG. 9, a pan motor can 1780 be connected to the second pan gear 1760. The pan motor 1780 is configured to drive the second pan gear 1760 to rotate the pan 1610 between a substantially horizontal state, as illustrated by positions "A", "B" and "C" in FIGS. 2 and 3, to a turned-to-dump state, as illustrated by position "D" in FIG. 4.

More specifically, a rotation of the second pan gear 1760 by the pan motor 1780 causes the first pan gear 1740 and the first central axis 1750 to rotate, which causes the chain 1624 to move. The movement (or rotation) of the chain 1624 rotates the second central axis 1770, which, in turn, rotates the pan 1770 relative to the arm 1620.

Notably, the collector assembly 1600 is advantageous because the configuration of the first pan gear 1740, the first central axis 1750, the chain 1624 and the second central axis 1770 keeps the pan 1610 in a steady (or unchanged) alignment relative to the horizontal axis while the arm 1610 is rotated in the direction "R" and opposite to the direction "R". See the pan 1610 staying in the substantially horizontal state in the positions "A", "B" and "C" in FIGS. 2-3.

This is because rotation of the arm 1620 in the direction "R" will cause the chain 1624 to simultaneously rotate the second central axis 1770 in a direction opposite to the rotation direction "R" (by the same magnitude as the magnitude of the rotation of the arm 1620), and vice-versa. Therefore, the chain 1624 counters the rotational effect of the arm 1620, ensuring that the pan 1610 keeps the same alignment relative to the horizontal axis (e.g., a substantially level alignment) while the arm 1620 is rotated.

Advantageously, the mechanism of maintaining the same alignment of the pan 1610 during a rotation of the arm 1620 is carried out without using the pan motor 1780. This is because the first central axis 1750 remains fixed while the arm 1620 rotates around the first central axis 1750 for the chain 1624 to self-align the pan 1610 with the horizontal axis during the rotation of the arm 1620. Stated otherwise, the engagement between the chain 1624, first central axis 1750 and the second central axle 1770 keeps the pan 1610 self-leveled (or causes the pan 1610 to maintain its alignment relative to the horizontal axis) during a rotation of the arm 1620. This configuration is advantageous because it requires no work to be performed by the pan motor 1780 to keep the pan 1610 level during rotation of the arm 1620 while ensuring an accurate and real-time alignment of the pan 1610 with the horizontal axis as the arm 1620 is rotated.

The configuration of the collector assembly 1600 is advantageous also because both motors 1720 and 1780 are supported by the chassis 1610, thereby reducing the weight carried by the arm 1620 (compared to a configuration where the motors 1720 and/or 1780 were to be carried by the arm 1620). The reduction of weight carried by the arm 1620 (by attaching the motors 1720 and 1780 to the chassis 1100) increases the accuracy of work of the pan 1610 (e.g., decreases swinging, wiggle or, generally speaking, play) in the pan 1610 during operation of the collector assembly 1600 due to little weight being placed on moving parts such as the arm 1620. Coincidentally, such a configuration of the collector assembly 1600 can increase the weight carrying capacity of the pan 1610.

As illustrated in FIG. 9, the first pan gear 1740 and the first arm gear 1700 may be disposed on opposite sides of the arm 1620.

Referring to FIGS. 2 and 4, the cleaning robot 1000 may include a platform 1800 rotatably connected to the chassis 1100. The platform 1800 may rotate about a Z axis. The Z axis crosses the platform 1800. For example, the Z axis may extend vertically to the platform 1800.

FIG. 2 exemplarily illustrates the platform 1800 in a first state (e.g., with the length direction of the refuse containers 1400, 1500 oriented generally along the front-to-back alignment of the robot 1000). The platform 1800 may be set to the first state when no item is being dumped into a refuse container 1400, 1500 (e.g., when the robot 1000 is traveling and/or not yet ready to dump a captured refuse item into any of the refuse containers 1400, 1500).

As illustrated in FIG. 4, the platform 1800 can be rotated about the Z axis to place one of the first and second refuse containers 1400, 1500 being associated with the same category of refuse as the determined category of refuse that is picked up by using the pan 1610. As illustrated in FIG. 4 as an example, the platform 1800 is rotated to a second state that places the second refuse container 1500 into the dumping path of the pan 1610 (with the first refuse container 1400 moved away from the dumping path of the pan 1610) to ensure that the refuse item picked up by the pan 1610 (e.g., crumpled paper) is discharged from the pan 1610 into the second refuse container 1500 (which in this example is configured to receive paper or recyclable paper waste).

Had the pan 1610 been loaded with a different category of waste, merely as an example, food remains, and the first refuse container 1400 was associated with the food remains category (i.e., intended to be loaded with food remains), the platform 1800 would be rotated to position the first refuse container 1400 under the pan 1610 (when the pan 1610 is positioned at the top of the robot 1000, as illustrated in FIG. 4) such that the food remains loaded on the pan 1610 would fall into the first refuse container 1400.

FIG. 3 omits the first and second refuse containers 1400, 1500 for clarity purposes.

In an approach, with reference to FIG. 3, the rotation of the platform 1800 can be accomplished by utilizing a first platform gear 1810 fixedly connected to the chassis 1100 with the platform 1800 rotatably connected to the first platform gear 1810. A second platform gear 1820 may be engageably connected to the first platform gear 1810. A platform motor 1830, connected to the second platform gear 1820, can be selectively rotated to rotate itself (i.e., the platform motor 1830) and the platform 1800 about the Z axis. This way, the platform motor 1830 can be operated to rotate the platform 1800 in a way that places a refuse container (from among the refuse containers 1400, 1500) that matches the category of the refuse item picked up by the pan 1610 under the pan 1610 when the pan 1610 is placed above the container and is ready to be rotated to dump the item carried thereon downwardly via gravity, as described in this specification.

After the first refuse item has been inserted in the designated container, from among the first and second refuse containers 1400, 1500, the method may revert to monitoring the space for additional refuse items to pick up. For example, the robot 1000 may autonomously drive about the space with the camera 1310 acquiring images of the space to detect items to pick up. Upon detection of a new refuse item, the category of the item can be identified and the item can be picked up via the pan 1610 and inserted into a refuse container (from among the refuse containers 1400, 1500) matching the category of the picked up item as described in this specification.

The robot 1000 can also be configured to dump the contents of the first and second refuse containers 1400, 1500 when capacity sensors monitoring the fill state of the refuse containers 1400, 1500 indicates that the container 1400 and/or 1500 is/are filled to or above a predetermined fill level.

Stated otherwise, at least one of the first and second refuse containers 1400, 1500 can be rotatably connected to the platform 1800 along an axis that crosses the Z axis (e.g., along a horizontal axis to enable the refuse container to be rated about the horizontal axis) such that the at least one of the first and second refuse containers 1400, 1500 can be selectively rotated to enable refuse contained therein to be dumped downwardly by virtue of gravity.

Figure 6:
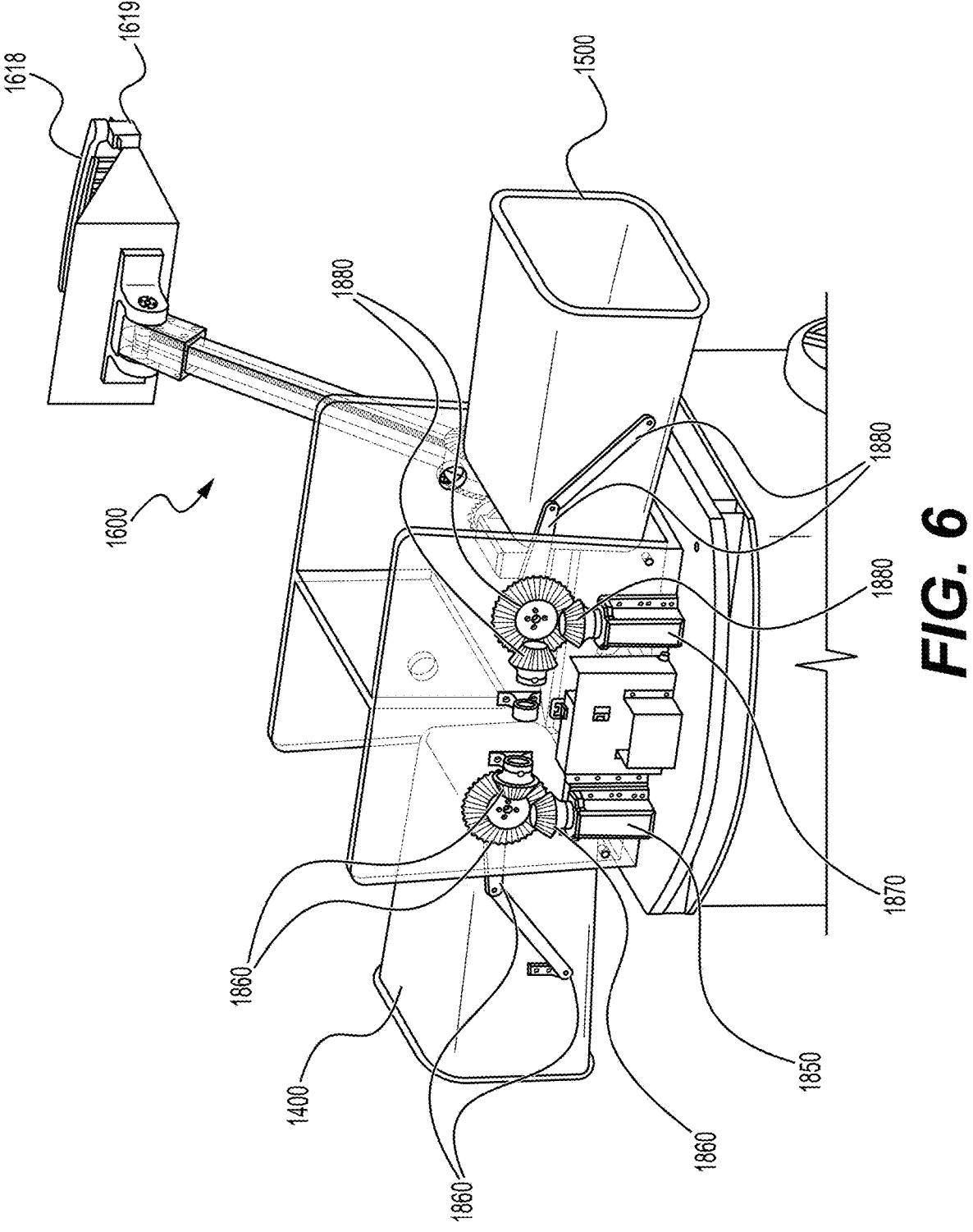
FIG. 6 is a perspective view illustrating the cleaning robot included in the system of FIG. 1 with a component of the cleaning robot shown in transparency.

Referring to FIG. 6, the cleaning robot 1000 may include a first refuse motor 1850 connected to the platform 1800 and a first refuse linkage 1860 connecting the first refuse motor 1850 with the first refuse container 1400. The first refuse motor 1850 and the first refuse linkage 1860 are configured to rotate the first refuse container 1400 between a first state (see FIG. 2), in which the first refuse container 1400 is oriented to contain refuse inserted therein by the pan 1610, and a second state (see FIG. 6), in which the first refuse container 1400 is oriented to discharge the refuse contained therein outwardly via gravity.

Referring to FIG. 6, the cleaning robot 1000 may include a second refuse motor 1870 connected to the platform 1800 and a second refuse linkage 1880 connecting the second refuse motor 1870 with the second container 1500. The second refuse motor 1870 and the second refuse linkage 1880 are configured to rotate the second refuse container 1500 between a first state (see FIG. 2), in which the second refuse container 1500 is oriented to contain refuse inserted therein by the pan 1610, and a second state (see FIG. 6), in which the second refuse container 1500 is oriented to discharge the refuse contained therein outwardly via gravity.

Figure 5:
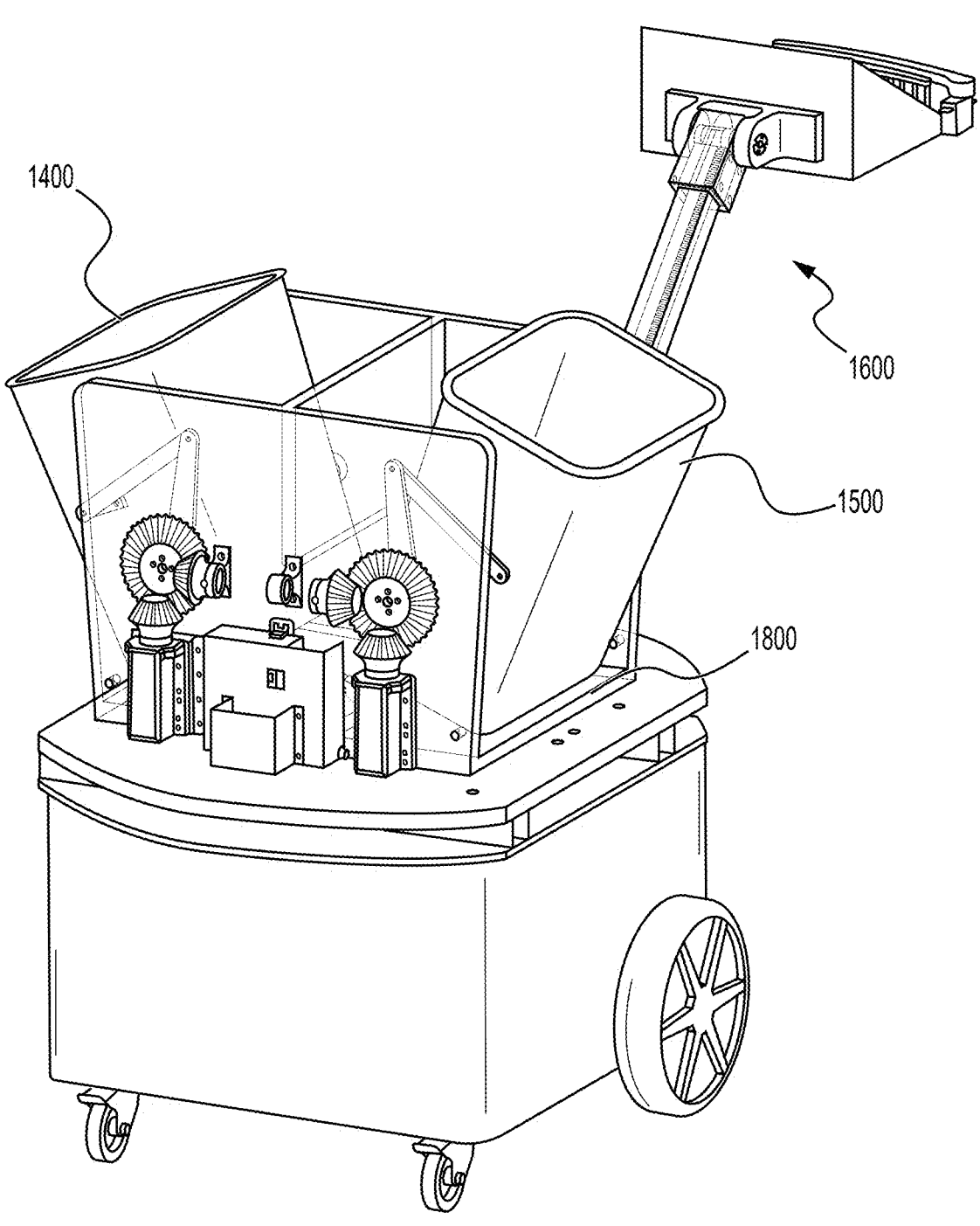
FIG. 5 is a perspective view illustrating the cleaning robot included in the system of FIG. 1 with a component of the cleaning robot shown in transparency.

FIG. 5 illustrates an intermediate state of the first and second refuse containers 1400, 1500 during their rotation between the first and second states thereof.

The robot 1000 can be autonomously driven to a pre-designated area (e.g., to a pre-designated chute or other dumping area) to discharge the contents of the first and second refuse containers 1400, 1500.

It is understood that the robot 1000 is exemplarily described as including two waste bins 1400, 1500 merely to convey that the robot 1000 can be used to identify, pick up and sort different kinds of refuse items into different onboard refuse bins. As such, a robot of the present subject matter can be constructed to contain three or more waste bins.

The system for collecting refuse described with reference to FIGS. 1-9 utilizes a robot with a pan for picking up refuse. A system of the present subject matter can also utilize different types for robots for picking up and sorting waste into different waste bins.

For example the system that will be described below with reference to FIGS. 10-13 utilizes a vacuum robot for picking up and sorting waste items into different refuse containers.

Figure 10:
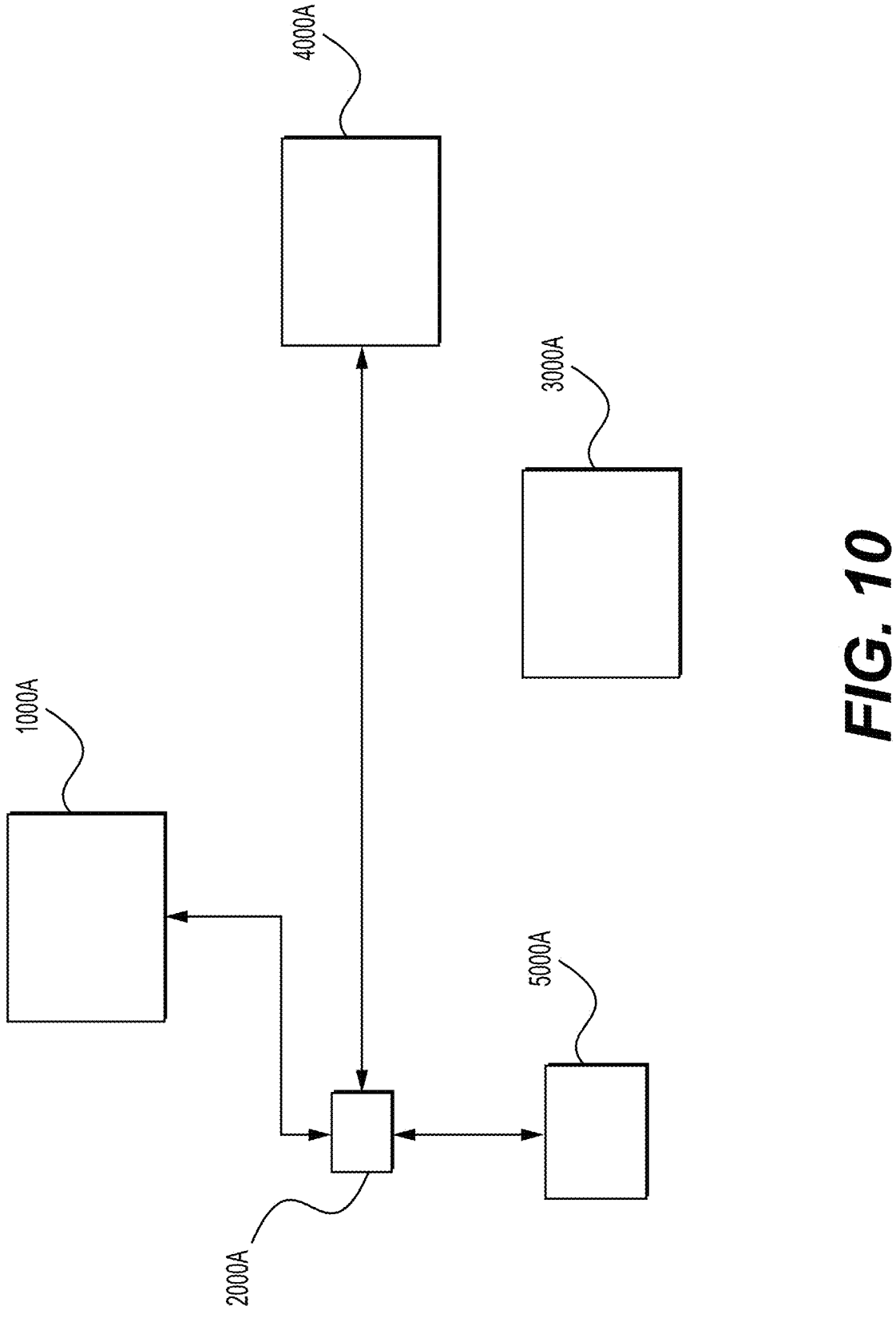
FIG. 10 is a diagram illustrating a system for collecting refuse in accordance with an embodiment of the present subject matter.

Referring to FIG. 10, a system for collecting refuse includes a cleaning robot 1000A, a processor 2000A communicatively coupled to the cleaning robot 1000A and a non-transitory, tangible program storage medium 5000A communicatively coupled to the processor 2000A.

The system of FIG. 10 may also include a charging pad 3000A configured to charge an onboard battery of the cleaning robot 1000A (when the cleaning robot 1000A includes a rechargeable battery onboard). The system of FIG. 10 may also include a monitoring and/or controlling station 4000A for monitoring the state of the cleaning robot 1000A and/or for controlling actions of the cleaning robot 1000A when needed (e.g., to override the autonomous operation mode of the cleaning robot 1000A).

The cleaning robot 1000A may alternatively be referred to as the "robot" 1000A below for brevity.

Aspects/features of the system of FIG. 10 not described in detail below may be assumed to be similar to or the same as corresponding aspects/features of the system of FIG. 1.

Figure 11:
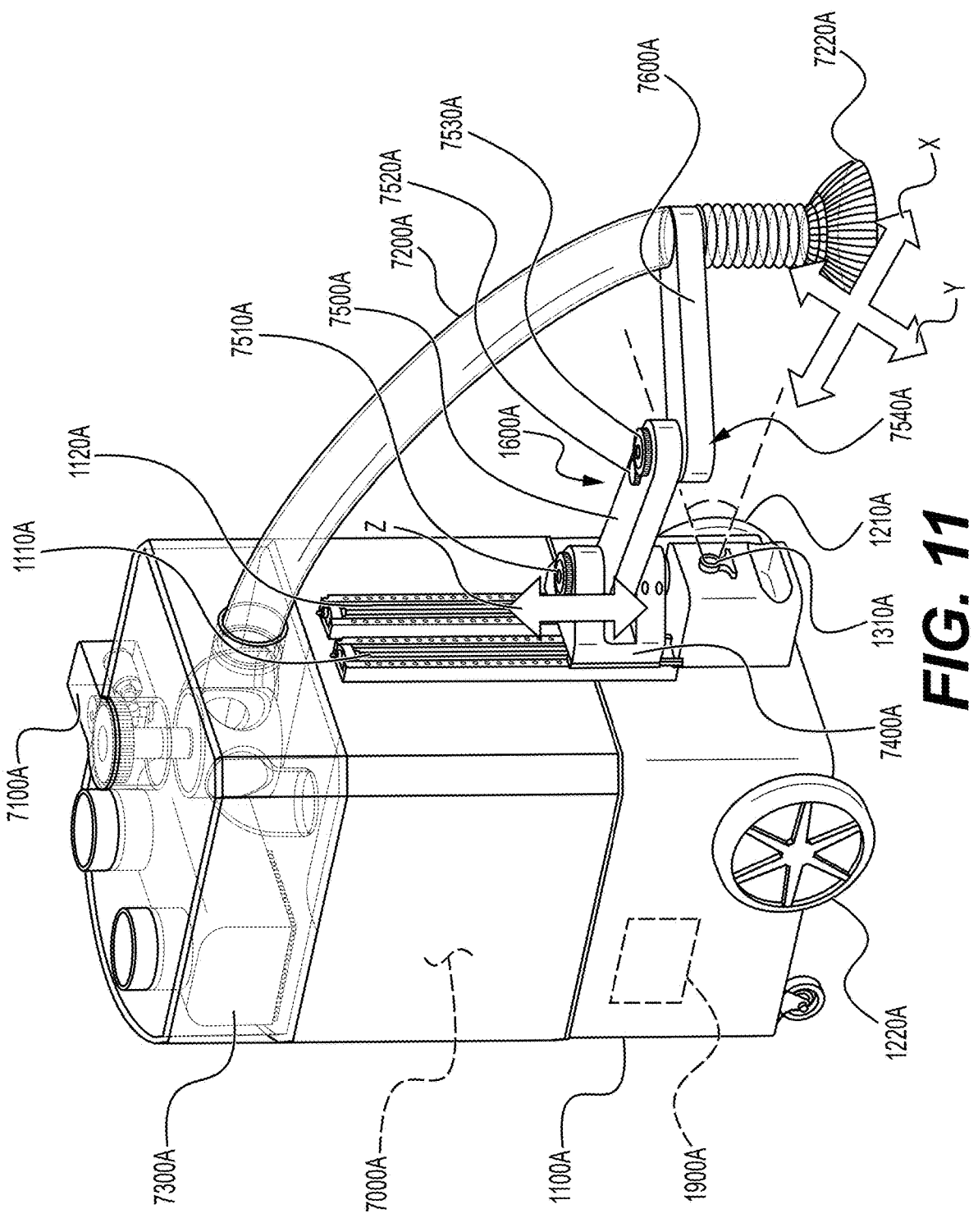
FIG. 11 is a perspective view illustrating a cleaning robot included in the system of FIG. 10.
Figure 12:
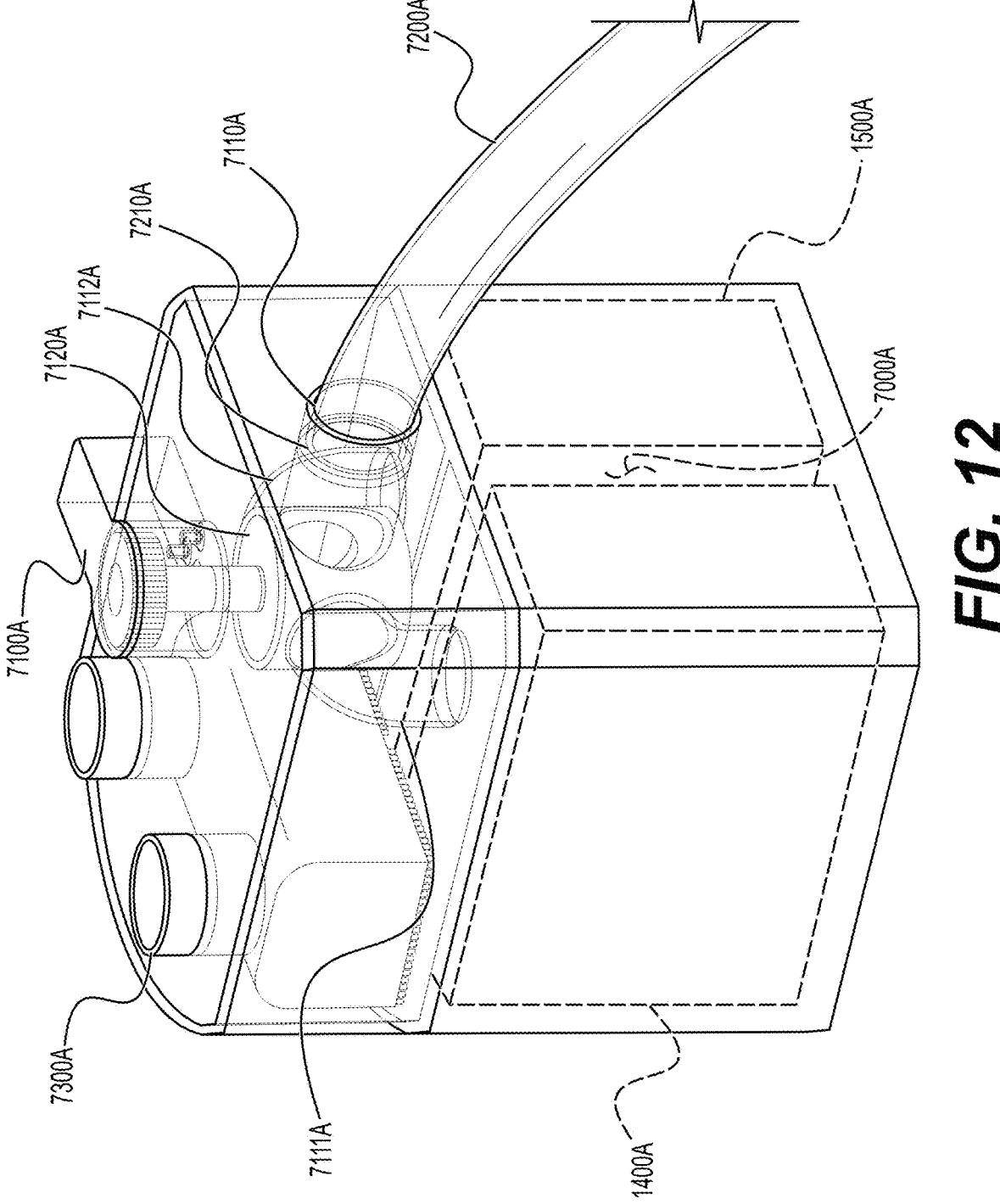
FIG. 12 is a perspective view illustrating a portion of the cleaning robot of FIG. 10 in transparency.
Figure 13:
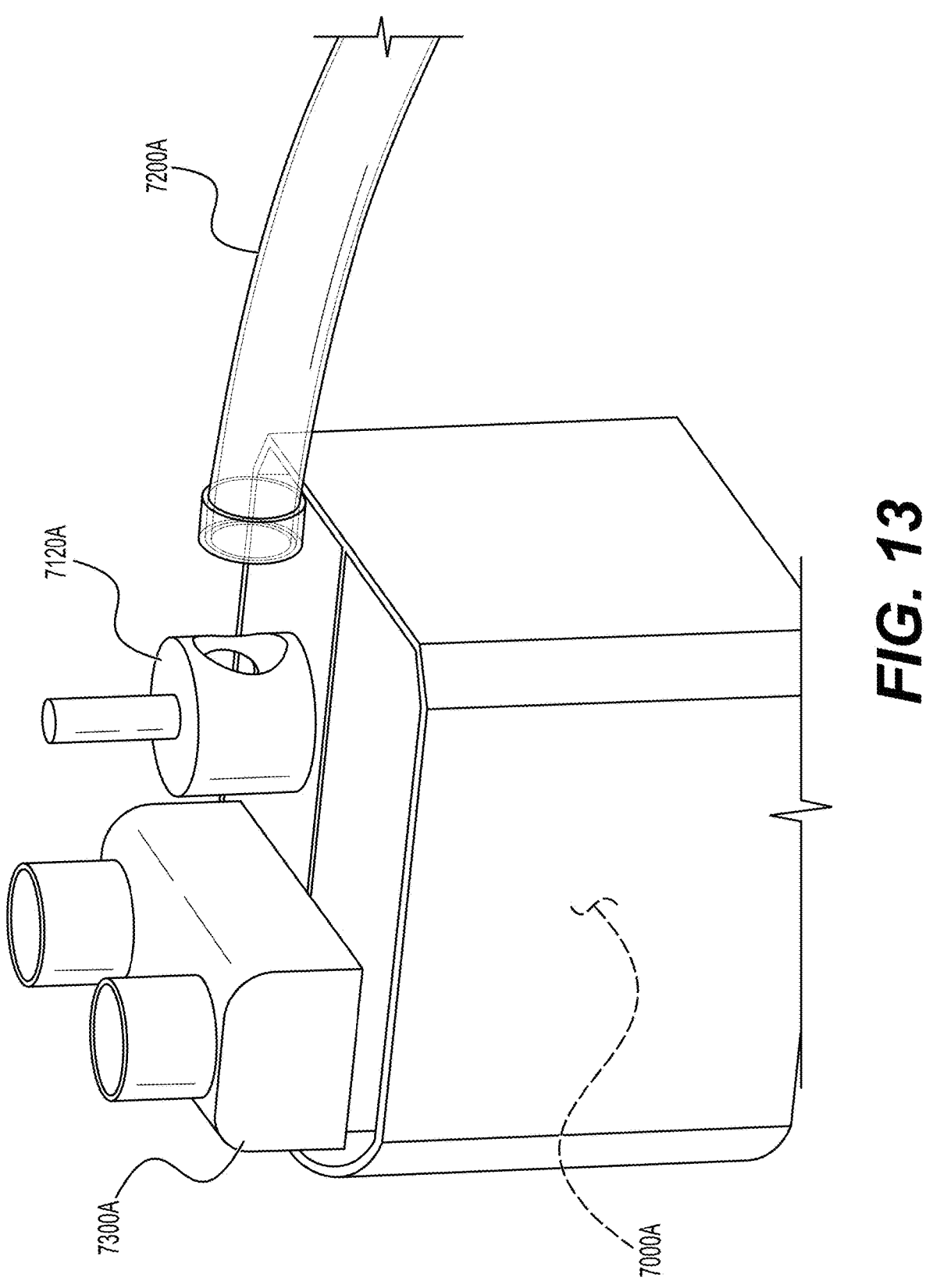
FIG. 13 is a perspective view illustrating a portion of the cleaning robot of FIG. 10 in transparency.

Referring to FIG. 11, robot 1000A includes a chassis 1100A;

first and second driving wheels 1210A, 1220A mounted to the chassis 1100A;

a set of monitoring devices including a camera or a video camera 1310A;

a vacuum chamber 7000A housing therein a first refuse container 1400A, associated with a first refuse category, and a second refuse container 1500A, associated with a second refuse category, different from the first refuse category, a valve 7100A;

a hose moving assembly 1600A movably connected to the chassis 1100A;

a hose 7200A connected to the hose moving assembly 1600A;

a vacuum pump 7300A; and an electrical power source 1900A disposed on the chassis 1100A.

The vacuum chamber 7000A is in fluid communication with the valve 7100A and with the hose 7200A. The valve 7100A fluidly connects the hose 7200A and the vacuum chamber 7000A to one another.

The vacuum pump 7300A is configured to apply vacuum to the vacuum chamber 7000A, to the valve 7100A and to the hose 7200A such that refuse can be collected by vacuum via a second opening 7220A of hose 7200A.

The valve 7100A includes:

an inlet opening 7110A fluidly connected to a first end 7210A of the hose 7200A, opposite to the second end 7220A;

a first outlet opening 7111A positioned to discharge refuse into the first refuse container 1400A; and a second outlet opening 7112A positioned to discharge refuse into the second refuse container 1500A.

The valve 7100 is selectively controllable to block either the first outlet opening 7111A or the second outlet opening 7112A such that a refuse item being suctioned by vacuum via the hose 7200A can be selectively directed to the first refuse container 1400A or to the second refuse container 1500A, by matching the category of the refuse being suctioned with the category of refuse that one of the first and second refuse containers 1400A, 1500A is designed to accept.

The valve 7100 can have a flow director 7120A (more clearly visible on FIG. 13) on its inside, movable (e.g., rotatable) by a motor of the valve 7100A to selectively block the first outlet opening 7111A, in order to enable gaseous fluid with refuse to flow between the inlet opening 7110A and the second outlet opening 7112A (to discharge refuse in the second refuse container 1500A). The flow director 7120A can also be movable by the motor of the valve 7100A to selectively block the second outlet opening 7112A in order to enable gaseous fluid with refuse to flow between the inlet opening 7110A and the first outlet opening 7111A (to discharge refuse in the first refuse container 1400A).

The non-transitory, tangible program storage medium 5000A is readable by the system of FIG. 10 for collecting refuse. The non-transitory, tangible program storage medium 5000A embodies a program of instructions executable by the processor 2000A to perform method steps for collecting refuse.

The method includes:

monitoring a space using the set of monitoring devices including the camera or the video camera 1310A;

identifying a first refuse item based on the monitoring of the space;

moving the cleaning robot 1000A toward the identified first refuse item using the first and second driving wheels 1210A, 1220A;

associating the identified first refuse item with a refuse category selected from among the group consisting of the first and second refuse categories based on an analysis of one or more images or video sequences obtained by using the camera or video camera 1310A;

operating the vacuum pump 7300A to apply vacuum pressure to the vacuum chamber 7000A;

operating the valve 7100A to create a vacuum path of flow toward the container associated with a same refuse category as the refuse category of the identified first refuse item, from among the first and second refuse containers 1400A, 1500A; and operating the hose moving assembly 1600A to place the second end 7220A of the hose 7200A sufficiently close to the identified first refuse item where vacuum pressure applied from the vacuum pump 7300A can be applied to the identified first refuse item to suction the identified first refuse item and transport the same via the hose 7200A and the valve 7100A to the container associated with the same refuse category as the refuse category of the identified first refuse item, from among the first and second containers 1400A, 1500A.

Referring to FIG. 11, the hose moving assembly 1600A may include:

a base 7400A movably connected to the chassis 1100A along a first axis Z; and at least one arm (selected from the arms 7500A, 7600A) rotatably connected to the base 7400A, The at least one arm is connected to the hose 7200A and is configured to move the second end 7220A of the hose 7200A sufficiently close to the identified first refuse item.

The hose moving assembly 1600A may include a first motor 7510A configured to rotate the at least one arm (e.g., the arm 7500A) about an axis that is parallel to the first axis Z or about an axis that crosses a direction in which the first axis Z extends. The rotation of the at least one arm about an axis is that parallel to the Z axis (or even about the Z axis itself) moves a second end 7220A of the hose 7200A about an X-Y plane, (see FIG. 11) to locate the second end 7220A of the hose 7200A above a refuse item that should be suctioned.

Referring to FIG. 11, the at least one arm of the hose moving assembly 1600A may include the first arm 7500A, rotatably connected to the base 7400A, and a second arm 7600A, rotatably connected to the first arm 7500A.

The hose moving assembly 1600A may also include a second motor 7540A configured to rotate the second arm 7600A about an axis that is parallel to the first axis Z. Gears 7520A and 7530A, engaged with one another, may be connected to the second motor 7540A to rotate the second arm 7600A relative to the first arm 7500A.

Referring to FIG. 11, the chassis 1100A may include at least one track or rail (selected from the group consisting of the first and second tracks or rails 1110A, 1120A) extending along the first axis Z. The base 7400A may be movably engaged to the at least one track or rail 1110A, 1120A such that the base 7400A can be moved (e.g., up and down) along the at least one track or rail 1110A, 1120A.

The cleaning robot 1000A may also include a motor configured to selectively move the base 7400A up and down along the at least one track or rail 1110A, 1120A.

A method for collecting refuse includes:

monitoring a space for a refuse item using a cleaning robot as described in this specification;

identifying a first refuse item based on the monitoring of the space;

moving the cleaning robot toward the identified first refuse item;

associating the identified first refuse item with a refuse category selected from among the group consisting of a first refuse category and a second refuse category based on an analysis of one or more images or video sequences obtained by using a camera or video camera of the cleaning robot;

determining which refuse container of the cleaning robot to insert the identified first refuse item in, from among the group consisting of a first refuse container and a second refuse container, by matching a refuse category of the identified with item with a category of refuse category associated with the first refuse container or with a refuse category associated with the second refuse container; and operating the cleaning robot to collect the identified first refuse item and to store the identified first refuse item in the refuse container determined to have a matching refuse category with the category of the identified first refuse item.

The step of operating the cleaning robot to collect the identified first refuse item and store the same may include:

using a collector assembly of the cleaning robot to collect the identified first refuse item and transport the same to the refuse container determined to have the matching refuse category with the category of the identified first refuse item, the collector assembly of the cleaning robot including:

a pan configured to carry refuse;

an arm having a length;

a first joint rotatably connecting the arm to the chassis; and a second joint rotatably connecting the arm to the pan, wherein the first and second joints are spaced apart from one another by the length of the arm;

wherein a rotation of the arm about the first joint is configured to cause the second joint and the pan to be raised or lowered, depending on a direction of said rotation to collect the identified first refuse item and transport the same to the refuse container determined to have the matching refuse category with the category of the identified first refuse item.

The step of operating the cleaning robot to collect the identified first refuse item and store the same may include:

operating a vacuum pump of the cleaning robot to apply vacuum pressure;

operating a valve of the robot to create a vacuum path of flow toward the container associated with a same refuse category as the refuse category of the identified first refuse item; and operating a hose moving assembly of the robot to place an end of a hose of the robot sufficiently close to the identified first refuse item where vacuum pressure generated from the vacuum pump can be applied to the identified first refuse item to suction the identified first refuse item and transport the same via the hose and the valve to the container associated with the same refuse category as the refuse category of the identified first refuse item.

The method may include a step of returning to a charging pad to charge a battery of the cleaning robot when a charge level of said battery falls below a predetermined threshold charge level.

The method may include a step of using a speaker of the cleaning robot to emit one or more alert sound(s) to announce a presence of the cleaning robot to persons and/or pets located in a vicinity of the cleaning robot.

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. A system for collecting refuse, the system comprising:
a processor;
a cleaning robot, wherein the cleaning robot includes:
a chassis;
first and second driving wheels mounted to the chassis;
a set of monitoring devices including a camera or a video camera;
a first refuse container associated with a first refuse category and a second refuse container associated with a second refuse category, different from the first refuse category, the first and second refuse containers being rotatably connected to the chassis;
a collector assembly movably connected to the chassis; and
an electrical power source disposed on the chassis; and
a non-transitory, tangible program storage medium, readable by the system for collecting refuse, embodying a program of instructions executable by the processor to perform method steps for collecting refuse, the method comprising:
monitoring a space using the set of monitoring devices including the camera or the video camera;
identifying a first refuse item based on the monitoring of the space;
moving the cleaning robot toward the identified first refuse item using the first and second driving wheels;
associating the identified first refuse item with a refuse category selected from among the group consisting of the first and second refuse categories based on an analysis of one or more images or video sequences obtaining by using the camera or video camera;
placing a refuse container from among the group consisting of the first and second refuse containers, which matches the refuse category associated with the identified first refuse item, in a receiving position on the chassis; and operating the collector assembly to collect the identified first refuse item and to transport the collected first refused item into the refuse container placed in the receiving position.

2. The system of claim 1, wherein the collector assembly of the cleaning robot includes:

a pan configured to carry refuse;

an arm having a length;

a first joint rotatably connecting the arm to the chassis; and a second joint rotatably connecting the arm to the pan, wherein the first and second joints are spaced apart from one another by the length of the arm;

wherein a rotation of the arm about the first joint is configured to cause the second joint and the pan to be raised or lowered, depending on a direction of said rotation.

3. The system of claim 2, wherein the first joint includes:

a first arm gear fixedly connected to the arm; and a second arm gear engaged with the first arm gear such that a rotation of the second arm gear is configured to cause the first arm gear to rotate about the first joint.

4. The system of claim 2, wherein the first joint includes:

a first pan gear having a first central axle, wherein the first central axle extends inside of the arm in a direction that is lateral to the length of the arm, and the first central axle is rotatably connected to the arm; and a second pan gear engaged with the first pan gear;

wherein the second joint includes a second central axle extending inside of the arm in a direction that is lateral to the length of the arm, the second central axle being rotatably connected to the arm and fixedly connected to the pan such that a rotation of the second central axle about the arm is configured to rotate the pan about the arm;

wherein the arm includes a cavity extending along the length of the arm, the cavity extending from the first central axle to the second central axle;

wherein the collector assembly further includes a chain, a belt, a string or a rope forming a loop around the first and second central axles in the cavity, the chain, the belt, the string or the rope movably engaging the first and second central axles such that the pan can maintain its alignment relative to a horizontal axis without actuation of a pan motor during a rotation of the arm, wherein the first central axle is configured to remain fixed while the arm rotates around the first central axle to self-align the pan relative to the horizontal axis in real-time; and wherein the first joint further includes:

a first arm gear fixedly connected to the arm; and a second arm gear engaged with the first arm gear such that a rotation of the second arm gear is configured to cause the first arm gear to rotate about the first joint.

5. The system of claim 4, wherein the first pan gear and the first arm gear are disposed on opposite sides of the arm.

6. The system of claim 1, wherein the cleaning robot further includes a platform rotatably connected to the chassis, the first and second refuse containers being mounted to the platform.

7. The system of claim 1, wherein at least one of the first and second refuse containers is rotatably connected to the platform such that the at least one of the first and second refuse containers can be selectively rotated to enable trash contained therein to be dumped downwardly by virtue of gravity.

8. The system of claim 7, wherein the cleaning robot further includes a first refuse motor connected to the platform and a first refuse linkage connecting the first refuse motor with the first refuse container, the first refuse motor and the first refuse linkage being configured to rotate the first refuse container between a first state, in which the first refuse container is oriented to contain therein refuse inserted therein by the pan, and a second state, in which the first refuse container is oriented to discharge refuse contained therein outwardly via gravity.

* * * * *